July 6, 1937.  H. R. SCOTT  2,085,769
PROPELLER
Filed Feb. 26, 1936
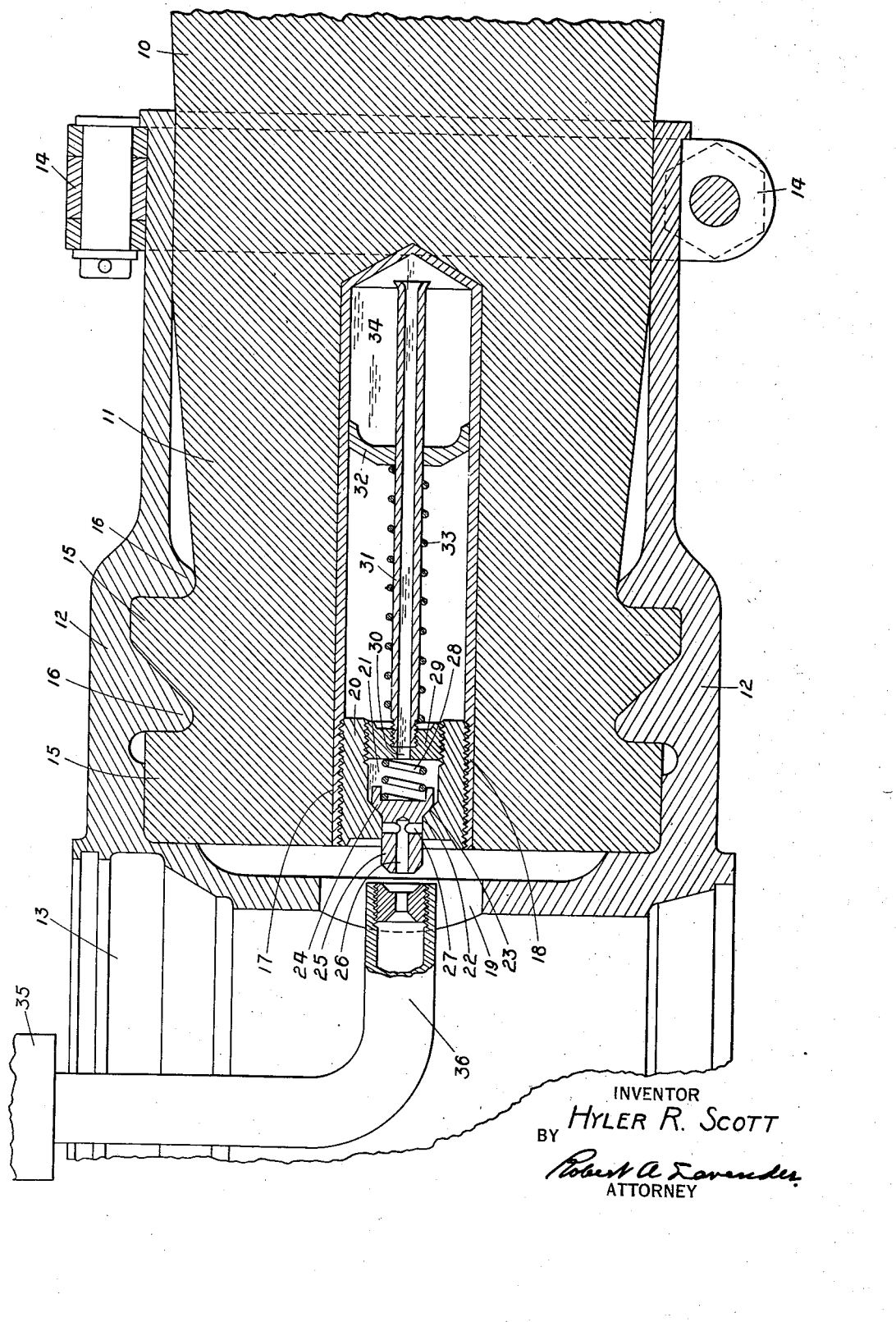
INVENTOR
BY *Hyler R. Scott*
*Robert A. Lavender*
ATTORNEY Patented July 6, 1937

2,085,769

UNITED STATES PATENT OFFICE 2,085,769

PROPELLER

Hyler R. Scott, Philadelphia, Pa.

Application February 26, 1936, Serial No. 65,767

8 Claims. (Cl. 170—135)

(Granted under the act of March 3, 1883, as amended April 30, 1928; 370 O. G. 757)

The present invention relates to propellers for aircraft and has a particular relation to means for balancing the same.

One of the objects of the invention is the provision of a simple and efficient means for balancing a propeller blade without removing the blade from its hub and without drilling holes in the blade and filling them with a solid weighting material.

Another object of the invention is the provision of means whereby a fluid weighting material may quickly and easily be inserted in a propeller blade or removed therefrom in order to obtain a very accurate balance and in which the weighting material is effectually sealed against accidental displacement.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing, means for carrying the invention into practical effect, without limiting the improvements in their useful application to the particular construction, which, for the purpose of explanation, have been made the subject of illustration.

The single figure of the accompanying drawing is a fragmentary longitudinal sectional view through the root portion of a propeller blade and the cooperating part of the hub, illustrating the manner in which the weighting material is applied by a suitable pressure operated gun.

Referring to the drawing, the invention is shown as comprising a propeller blade 10, the root portion 11 of which is clamped between the cooperating halves 12 and 12a of the socket portion of a split hub 13 by means of a suitable clamping strap 14. The root portion 11 of the blade 10 is formed with a plurality of circumferential ribs 15 for interlocking engagement with cooperating ribs 16 formed on the internal surface of the hub 13. The root portion 11 is also formed with a radially extending bore 17 within which a metal container 18 is suitably secured in axial alignment with an opening 19 formed in the hub 13. A sleeve 20 is threaded into the inner end of the container 18 and is formed with a chamber 21 and an axial opening 22 surrounded by a conical valve seat 23, the latter being engaged by a valve 24 having a stem 25 mounted for axial sliding movement in the opening 22. The stem 25 is formed with an axial passageway 26 and transversely extending ports 27 which are closed when the valve 24 is closed. This valve is normally maintained closed by a coil spring 28 which is interposed between the valve and a plug 29 which is screw threaded into the other end of the sleeve 20. The plug 29 is formed with an axial passageway 30 communicating with a tube 31 which is screw threaded into the inner end of the plug 29 and terminating a slight distance from the outer end of the container 18. A piston or plunger 32 is mounted for sliding movement within the container 18 in close contact with the wall thereof and with the tube 31. This piston is urged outwardly by a coil spring 33 which surrounds the tube 31 between the piston and the plug 29 so as to confine a body of mercury or other fluid weighting material 34 in the outer end of the container.

This weighting material is introduced into the container 18 under pressure from a suitable device 35, similar to a grease gun, having a nozzle 36 which is inserted axially through the central shaft opening in the hub 13 and radially through the opening 19 into engagement with the valve stem 25 which is forced outwardly thereby so as to open the valve 24. The weighting material 34 is then forced through the passageway 26 and ports 27 and past the valve 24 into the chamber 21 and thence through the passageway 30 and tube 31 into the container 18 between its outer end and the piston 32, forcing the latter inwardly against the action of the spring 33. As soon as the desired amount of weighting material is introduced into the container 18, pressure on the nozzle 36 is removed, thus permitting the valve 24 to close under the action of the spring 28 and confining the proper amount of weighting material within the container. If too much of the material is forced into the container, the excess quantity may be removed by simply depressing the valve stem 25 so as to permit the material to be forced out of the container by the piston 32 and spring 33.

From the foregoing it will be apparent that a very simple and efficient device is provided whereby a propeller blade may be balanced very accurately without the necessity of disassembling the propeller from the hub with the consequent danger of disturbing its pitch or angular adjustment about its longitudinal axis and without the relatively slow and inaccurate method heretofore practiced of drilling holes in the blade and filling the same with soft metal.

While the invention has been described in connection with propellers for aircraft, it will be appreciated that it may be employed for other purposes, such as for balancing flywheels and other rotating parts where an accurate balance is required.

The invention herein described may be modified in construction and arrangement of the parts by those skilled in the art without departing from the nature and scope of the invention as defined in the appended claims.

The invention herein described may be manufactured and used by or for the Government of the United States of America for governmental purposes without the payment of any royalties thereon or therefor.

I claim:

1. A propeller having in combination a hub, a blade having its root portion secured to the hub, the root portion being provided with a chamber for containing a weighting fluid for balancing said blade, means for confining said weighting fluid at one end of said chamber and closure means for preventing the escape of said fluid from said chamber.

2. A propeller having in combination a hub, a blade having its root portion secured to the hub, the root portion being provided with a chamber of variable capacity for containing a weighting fluid for balancing said blade, and closure means for preventing the escape of said fluid from said chamber.

3. A propeller having in combination a hub, a blade having its root portion secured to the hub, the root portion being provided with a chamber having a movable wall for containing varying volumes of weighting fluid for balancing said blade, and closure means for preventing the escape of said fluid from said chamber.

4. A propeller having in combination a hub, a blade having its root portion secured to the hub, the root portion being provided with a chamber for containing a weighting fluid for balancing said blade, a piston in said chamber for confining said weighting material at the outer end of said chamber, and closure means for preventing the escape of said fluid from said chamber.

5. A propeller having in combination a hub, a blade having its root portion secured to the hub, the root portion being provided with a chamber, a body of mercury disposed within said chamber for balancing said blade, a piston for urging said body of mercury toward one end of said chamber and closure means for preventing the escape of said fluid from said chamber.

6. A propeller having in combination a hub, a blade having its root portion secured to the hub, the root portion being provided with a chamber for containing a weighting fluid for balancing said blade, a tubular member extending coaxially of said chamber for introducing a fluid weighting material into said chamber, and closure means for preventing the escape of said fluid from said tubular member and said chamber.

7. A propeller having in combination a hub, a blade having its root portion secured to the hub, the root portion being provided with a chamber for a tubular member extending coaxially of said chamber for introducing a fluid weighting material into said chamber for balancing said blade, a piston slidably mounted on said tubular member for confining said weighting material in the outer end of said chamber, and a check valve for preventing the escape of said fluid from said tubular member and said chamber.

8. A propeller having in combination a hub, a blade having its root portion secured to the hub, the root portion being provided with a chamber for containing a weighting fluid for balancing said blade, yieldable means for urging said weighting fluid toward one end of said chamber and valve means for preventing the escape of said fluid from said chamber.

HYLER R. SCOTT.